April 6, 1954  J. P. POUND  2,674,050
HIGH-FREQUENCY HEATING APPARATUS
Filed Sept. 6, 1949
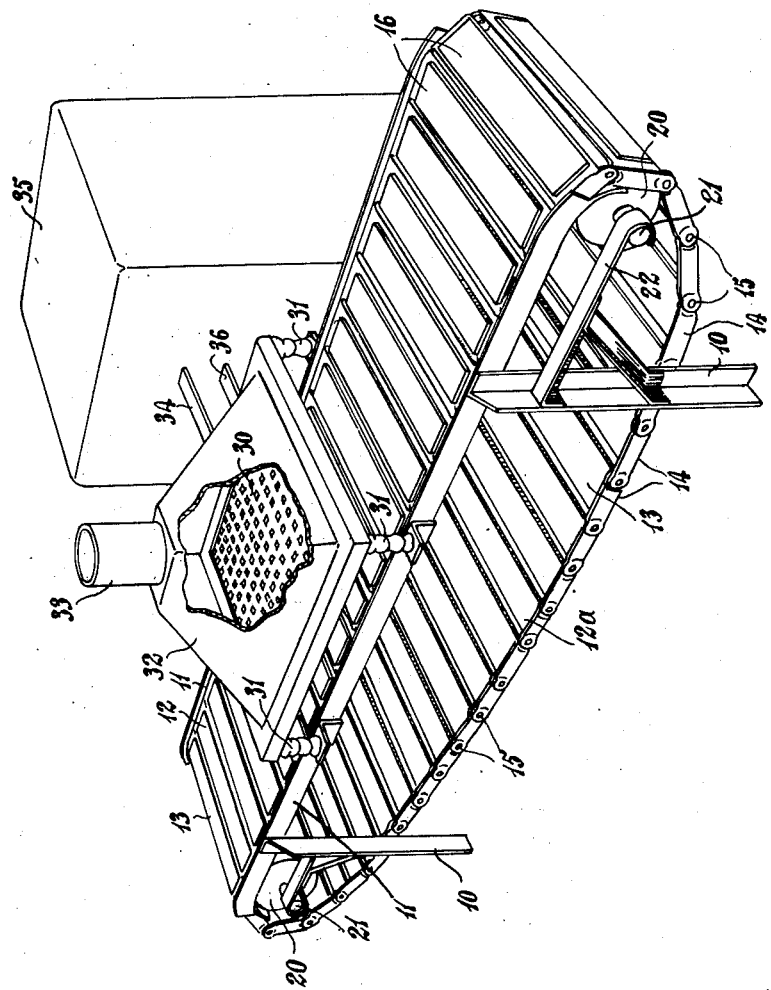
Inventor
JOHN PICKMAN POUND
By Blair & Black
Attorney Patented Apr. 6, 1954

2,674,050

UNITED STATES PATENT OFFICE 2,674,050

HIGH-FREQUENCY HEATING APPARATUS

John Pickman Pound, Cambridge, England, assignor to Pye Limited, Cambridge, England, a British company Application September 6, 1949, Serial No. 114,245

Claims priority, application Great Britain September 6, 1948

2 Claims. (Cl. 34—1)

The present invention relates to high frequency heating apparatus, particularly for use in drying sand cores as used in foundry moulding. In drying sand cores by high frequency heating, difficulty is experienced by the steam condensing on the upper electrode and the condensed water droplets falling back onto the cores being dried, and also by the creation of damp spots between the bottom of the core and the surface on which it is supported. These damp spots make the core soft and crumbly.

According to one aspect of the invention, in order to overcome the formation of water droplets, the upper electrode is perforated and is associated with an extractor fan whereby the steam generated may be withdrawn through the perforations and thereby be prevented from condensing upon the upper electrode.

From another aspect, in order to prevent the damp spots on the bottoms of the cores, they are supported, whilst being heated, upon a wooden support, preferably constructed of thin veneer in order that the effective air gap between the high frequency electrodes may be reduced to as small a dimension as possible. The wood absorbs the dampness at the base of the cores and itself is dried out by high frequency heating without the creation of damp spots on the core. Whilst numerous absorbent materials have been tried for eliminating the damp spots, wood has proved to be the only satisfactory material for this purpose.

In order that this invention may be more fully understood one embodiment will now be described by way of example with reference to the accompanying drawing.

Referring to the drawing: the apparatus comprises a supporting structure having legs 10, carrying guide members 11 which extend along the edges of the upper part of a conveyor 12 which is metallic and may be made up of a multiplicity of metal plates 13 having flanges 14 at their ends, the flanges being articulated to the flanges of the adjacent plates by joints 15. The upper surface of each plate 13 is covered with a veneer 16 of wood, such for instance as beech wood $\frac{1}{16}$" thick, which is bonded to the conveyor plate 13. It has been found that bonding by a process operated under the trade name "Redux" is suitable.

At each end of the guide member 11 is mounted a roller 20 having an axle 21 carried by brackets 22 attached to the guide member 11. The upper part of the conveyor between the guide members 11 forms a level platform on which articles, such for instance as sand cores to be dried, can be conveyed and it also provides loading and unloading platforms towards each end. As shown in the drawing the conveyor 12 is endless, the lower part hanging down as indicated at 12a between the rollers 20.

Over the central part of the upper surface of the conveyor 12 is mounted an air pervious member, which may be in the form of a perforated metal sheet or a metallic grid or mesh which forms an upper electrode 30. This electrode 30 is carried by insulating supports 31 from the guide members 11. The supports 31 are of sufficient height to enable the articles to be dried to pass freely on the conveyor 12 below the upper electrode 30. Above the upper electrode 30 is a housing 32 made of insulating material which carries on its upper part an extractor fan 33 which is arranged to draw air through the upper electrode 30 from the space between the upper electrode and the conveyor.

The upper electrode 30 is connected by a lead 34 to one terminal of a high frequency electric generator 35. The other terminal of the electric generator 35 is connected by a lead 36 to the other electrode which is formed by the metallic conveyor 12. In order to permit handling of the articles on the conveyor the conveyor is earthed, advantageously at a plurality of points, outside the electric field arising from the upper electrode 30.

In operation the articles such as cores to be dried are loaded onto one end of the conveyor 12 which is then moved so that the articles pass beneath the upper electrode 30. While under this electrode the high frequency current is applied and any moisture driven from the article is drawn through the upper electrode 30 by the extractor fan 33 and thereby condensation of moisture on the upper electrode and the possibility of such moisture dropping back on to the cores is prevented.

The wood bonded to the upper surface of the conveyor absorbs the dampness on the face of the cores and is itself dried out by the high frequency heating without the creation of damp spots on the core.

I claim:

1. High-frequency heating apparatus for drying sand cores as used in foundry practice, comprising a metallic conveyor, an air-pervious member carried on insulating supports and spaced above the conveyor to permit the cores on the conveyor to pass below it, the surface of the conveyor uppermost below the air-pervious member being covered with wood veneer, said air-pervious member constituting one electrode of the apparatus, the other electrode being constituted by the conveyor, means for applying high-frequency potential between the air-pervious member and the conveyor, and means for drawing air through the air-pervious member from the space between it and the conveyor.

2. High-frequency heating apparatus, comprising two substantially plane electrodes, means for supporting said electrodes horizontally in vertically spaced relation to constitute an upper and a lower electrode respectively, the upper electrode being of air-pervious construction and the lower electrode being substantially impervious to air and having on its upper surface a thin absorbent layer of wood, means for applying high-frequency potential between said electrodes, and means for drawing air through the upper electrode from the space between the electrodes.

References Cited in the file of this patent
UNITED STATES PATENTS

| Number | Name | Date |
|---|---|---|
| 2,231,457 | Stephen | Feb. 11, 1941 |
| 2,325,652 | Bierwirth | Aug. 3, 1943 |
| 2,397,897 | Wenger | Apr. 2, 1946 |
| 2,460,566 | Brown et al. | Feb. 1, 1949 |
| 2,485,609 | Koster et al. | Oct. 25, 1949 |
| 2,491,687 | Nutt | Dec. 20, 1949 |
| 2,592,691 | Hart | Apr. 15, 1952 |